Patented Aug. 11, 1936

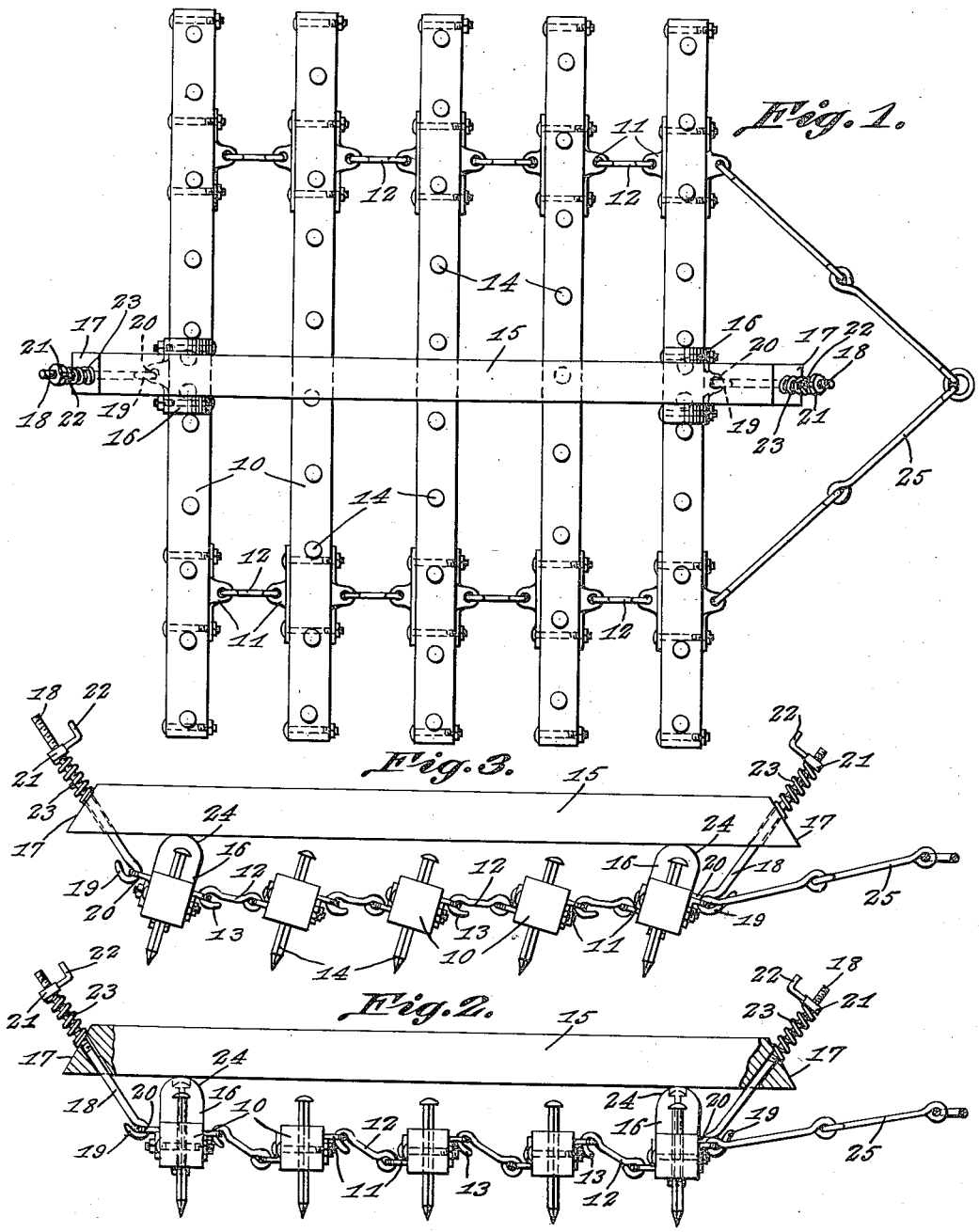

2,050,905

UNITED STATES PATENT OFFICE 2,050,905

HARROW

George H. Tune, Ripon, Calif.

Application March 27, 1936, Serial No. 71,215

3 Claims. (Cl. 55—76)

The invention relates to a harrow and more especially to a knock-down harrow.

The primary object of the invention is the provision of a harrow of this character, wherein the same is of novel construction so that in the cultivation of the ground trash will not be collected thereby due to flexibility in the arrangement of the harrow teeth and such harrow will assure all-over cultivation.

Another object of the invention is the provision of a harrow of this character, wherein the carrying bars for the harrow teeth are linked together and in this assembly are tensioned so that the harrow can be readily and conveniently knocked down when desired.

A further object of the invention is the provision of a harrow of this character, which is simple in construction, thoroughly reliable and efficient in its operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a top plan view of a harrow constructed in accordance with the invention.

Figure 2 is a side elevation partly in section.

Figure 3 is a side elevation showing the harrow adjusted to an operative position.

Similar reference characters indicate corresponding parts throughout the several views in the drawing.

Referring to the drawing in detail, the harrow comprises a plurality of teeth carrying beams 10, these being arranged in spaced parallel relation to each other and between the same and fixed thereto removed from the outer ends thereof are eyes 11 for links 12. The eyes on the beams 10 at one side thereof have the links permanently coupled therewith while the eyes on the other side of said beams have the links 12 detachably coupled thereto by hooks 13 formed with said links. Fixed in the beams at their longitudinal centers are harrow teeth 14 which pass therethrough and are held secure in any manner to protrude beneath the said beams for harrowing purposes.

Bridging the beams 10 at the center thereof is a bar 15 which rests upon fulcrum blocks 16 carried by the forward and rearward beams 10 of the group or series. This bar 15 has the reversely beveled ends 17 through which play downwardly convergent hangers 18 having hook ends 19 engageable in eyes 20 on the outer faces of the outermost beams 10 of the group or series. The hangers 18 carry adjustable nuts 21 threaded thereon and having hand grip extensions 22. Surrounding the hangers 18 between the ends 17 and the nuts 21 are coiled tensioning springs 23 which act against the bar 15 to hold the same seated upon the fulcrum blocks 16 which are provided with the rounded upper faces 24. Thus it will be seen that in the working of the harrow when the latter is under a draft the tendency of the teeth 14 is to slant rearwardly under biting action in the soil or ground and thus the foremost spring 23 will exert a tension upon the hanger 18 at the front end of the harrow to resist the rearward slanting movement of such teeth throughout the group of beams 10 carrying the same.

The links 12 are forwardly inclined in their attachment to the beams 10 as is clearly shown in Figure 2 of the drawing and by such assembly the harrow will avoid collecting trash during the service of such harrow for cultivating purposes.

Connected with the forward end of the harrow is a draft means 25 which may be of any suitable kind for the purpose of dragging the harrow over a field.

By slackening the tension of the springs 23 the links 12 can be separated from the eyes at the hook ends 13 of such links to permit of the knocking down of the harrow when the occasion requires. Thus under the construction of the harrow before referred to the parts thereof may be readily assembled and disassembled without the use of tools and with dispatch.

The flexibility of the beams 10 and the tensioning thereof will effect a more or less vertical position of the teeth 14 and should such teeth meet an obstruction they can incline rearwardly under tension to allow the same to pass such obstruction. In the working of the harrow it will be relieved of excessive weeds and will thoroughly cultivate the soil.

It is, of course, understood that the harrow may be duplicated so that these can be used in tendem or gang, that is to say, two or more of the harrows can be coupled together for tandem or gang service.

What is claimed is:

1. A harrow of the character described comprising a plurality of harrow teeth carrying beams, harrow teeth fixed in said beams, a bridge bar above said beams, fulcrum blocks on the outermost beams and having the bar contacting therewith, flexible connections between the beams, and tensioning means at opposite ends of the bar and engaged with the outermost beams.

2. A harrow of the character described comprising a plurality of harrow teeth carrying beams, harrow teeth fixed in said beams, a bridge bar above said beams, fulcrum blocks on the outermost beams and having the bar contacting therewith, flexible connections between the beams, tensioning means at opposite ends of the bar and engaged with the outermost beams, and means detachably connecting the flexible connections between the beams.

3. A harrow of the character described comprising a plurality of harrow teeth carrying beams, harrow teeth fixed in said beams, a bridge bar above said beams, fulcrum blocks on the outermost beams and having the bar contacting therewith, flexible connections between the beams, tensioning means at opposite ends of the bar and engaged with the outermost beams, means detachably connecting the flexible connections between the beams, and means for varying the tension of said tensioning means.

GEORGE H. TUNE.